Oct. 2, 1934.    C. F. SMITH ET AL    1,975,178
VALVE FOR LIQUID CO$_2$ AND LIKE FLASKS
Filed July 1, 1933
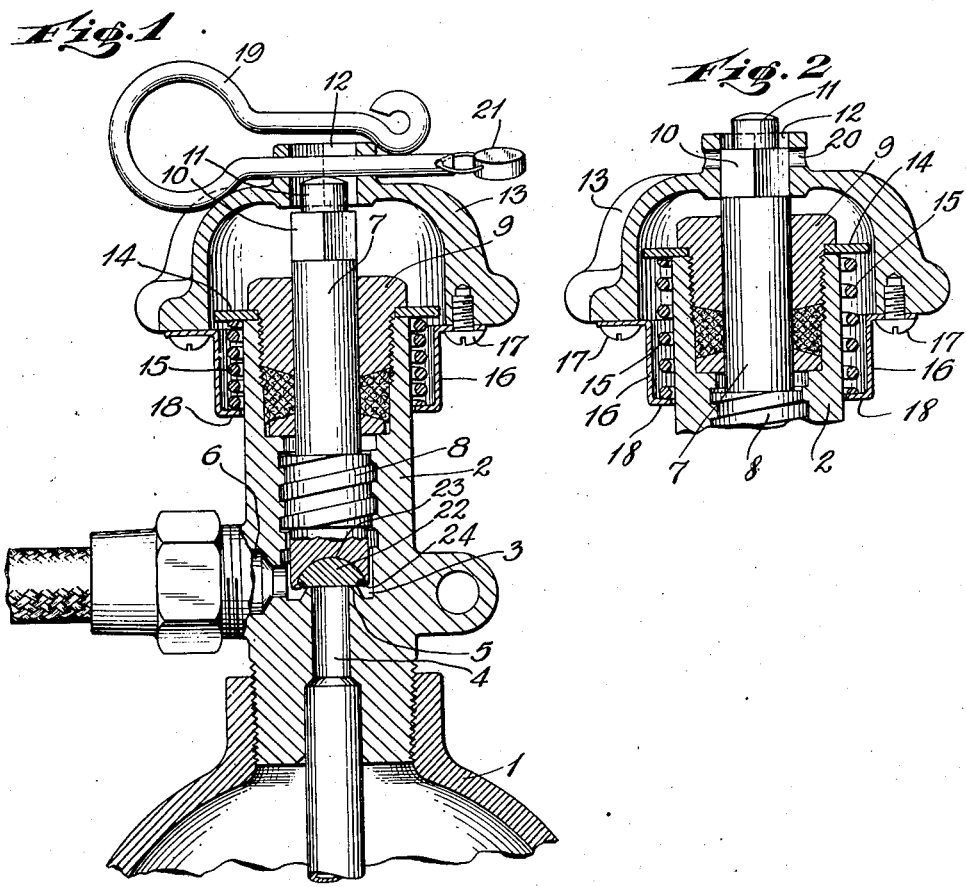
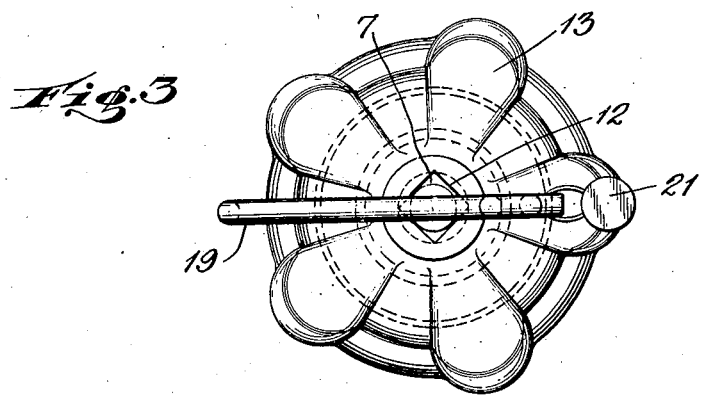
INVENTORS.
Carlisle F. Smith
and Charles H. Lindsay
BY
Jeffery, Kimball & Eggleston
ATTORNEYS.

Patented Oct. 2, 1934

1,975,178

UNITED STATES PATENT OFFICE

1,975,178

VALVE FOR LIQUID $CO_2$ AND LIKE FLASKS

Carlisle F. Smith and Charles H. Lindsay, Elmira, N. Y., assignors to American-La France and Foamite Corporation, a corporation of New York Application July 1, 1933, Serial No. 678,607

7 Claims. (Cl. 251—45)

This invention is a valve for liquid $CO_2$ and like flasks, which is locked against tampering but is releasable for authorized manual operation. It also comprises other distinctive features hereinafter described.

Referring to the drawing: Fig. 1 is a vertical section showing the closed valve locked against operation; Fig. 2 is a fragmentary detail central vertical section, showing the unlocked operative position, and Fig. 3 is a top plan corresponding to Fig. 1.

The usual flask 1 designed to contain liquid $CO_2$ and the like is closed by the valve body plug 2 screw-threaded into it. This plug has a chamber 3 communicating with the flask, when the valve is open, and receiving $CO_2$ discharged from the flask through the passage 4 surrounded by the seat 5. The chamber 3 discharges through passage 6. Valve spindle 7 by the quick pitch thread 8 on its enlarged portion is threaded into the chambered interior of the plug which is closed beyond the threaded part of the spindle by a conventional gland having gland nut 9. The spindle 7 extends up beyond the end of the plug and is squared or otherwise specially sectioned at 10, below its cylindrical end 11, to fit the correspondingly shaped axial hub opening 12 of the manual operating hand grip 13, which is designed to have two positions with respect to the valve body plug and valve spindle, namely, a normally axially displaced disconnected position shown in Fig. 1, and a connected operative position shown in Fig. 2. This hand grip, which constitutes manual operating means for the valve, is kept on the valve structure by the retaining flange 14 held on the valve body plug by the gland nut 9 and is preferably urged toward the connected position by a coil spring 15 housed in the hollow interior of the hand grip and its sheet metal sleeve member extension 16 secured thereto by screws 17. The ends of the spring react against the shoulders formed respectively by retaining flange 14 and the inturned flange 18 of sleeve 16. Movement of the hand grip by spring action or otherwise into connected position is normally prevented and the valve locked against unauthorized operation by the locking pin 19, the straight end of which is passed through diametrically opposite holes 20 in the hub of the hand grip, thus locating the pin directly over and in contact with the end of the valve spindle against which it is held by the spring when present. A seal 21 is applied to the end of the pin, as indicated. On removal of the pin and movement of the hand grip 13 into connection with the spindle 7 through registering parts 10 and 12, the valve may be operated. Opening of the valve is not resisted by friction due to the springs, since in the connected position of the hand grip and valve spindle the spring is fully expanded.

To avoid danger of gradual opening and consequent freezing of the expanding $CO_2$, valves controlling its discharge are quick-operating and it is of great practical importance that the valve seat uniformly and intimately over the entire area of the valve seat. In the valve of this application this is insured by the provision of a hemispherical washer 22, loosely mounted in a hemispherical socket 23 in the lower end of the valve spindle 7, this washer member being of a suitably hard non-metallic material and being retained with liberty of slight self-adjusting movement by the inturned edge 24 of the socket.

We claim:

1. In a valve for liquid $CO_2$ and like flasks, the combination of an axially movable valve spindle having cooperative relation with the flask, a manual operating hand grip therefor adapted to be connected to and move axially with said spindle, normally axially displaced to a disconnected position with relation thereto and having a tendency to move toward connected position, and means for locking said hand grip in said displaced position, said hand grip when in connected position serving as the means for rotating said spindle to open the flask.

2. In a valve for liquid $CO_2$ and like flasks, the combination of a valve spindle having cooperative relation with the flask and a manual operating hand grip therefor normally axially displaced to a disconnected position with relation thereto, spring means urging the hand grip toward connected position, and means for locking said hand grip in said displaced position, said hand grip when in connected position serving as the means for rotating said spindle to open the flask.

3. Valve structure for liquid $CO_2$ and like flasks, as set forth in claim 2, having a valve body plug provided with a retaining flange to keep the hand grip on the valve structure, said spring reacting between said flange and a part of the hand grip tending to move the hand grip on the valve spindle to said connected position.

4. Valve structure for liquid $CO_2$ and like flasks, as set forth in claim 2, having a valve body plug and which plug and said hand grip are provided with axially aligned shoulders, a locking pin normally removably located in the hand grip over the end of the valve spindle, and said spring interposed between said shoulders and holding the locking pin against the end of the valve spindle in hand grip disconnected position.

5. Valve structure for liquid $CO_2$ and like flasks, as set forth in claim 2, having a valve body plug and said spring means reacting between said plug and said hand grip and holding a part carried by the hand grip against the valve spindle in hand grip disconnected position, and in which the said spring is fully expanded in the connected position of the hand grip and valve spindle to avoid spring friction in the operation of the valve.

6. In a valve for liquid $CO_2$ and like flasks, a co-operating quick pitch valve body plug and valve spindle, the valve body plug having a discharge passage for the flask and a valve seat surrounding said passage, and the valve spindle having a hemispherical washer member loosely mounted in a corresponding hemispherical socket in the valve spindle for self-adjustment with respect to said seat, the valve seat-engaging portion of said washer member being of other contour than that of its hemispherical surface in the spindle socket, and means for retaining the washer member in the valve spindle and for limiting the extent of its movement.

7. In a valve for liquid $CO_2$ and like flasks, a valve body plug and a valve spindle screw-threaded therein, the valve body plug having a discharge passage for the flask and a valve seat surrounding said passage, and the valve spindle having a hemispherical washer member loosely mounted in a corresponding hemispherical socket in the lower end of the valve spindle for self-adjustment with respect to said seat, and means for retaining the washer member in the valve spindle and for limiting the extent of its movement.

CARLISLE F. SMITH.
CHARLES H. LINDSAY.